United States Patent
Sugiyama et al.

(10) Patent No.: US 6,736,730 B2
(45) Date of Patent: May 18, 2004

(54) TRIPOD TYPE CONSTANT-VELOCITY JOINT

(75) Inventors: Tatsuro Sugiyama, Shizuoka (JP); Fumihiro Isobe, Shizuoka (JP); Haruo Nagatani, Shizuoka (JP); Masashi Hashiya, Osaka (JP)

(73) Assignees: NTN Corporation, Osaka (JP); Nakanishi Metal Works Co., Ltd., Osaka (JP)

( * ) Notice: Subject to any disclaimer, the term of this patent is extended or adjusted under 35 U.S.C. 154(b) by 0 days.

(21) Appl. No.: 10/228,074

(22) Filed: Aug. 27, 2002

(65) Prior Publication Data

US 2003/0045363 A1 Mar. 6, 2003

(30) Foreign Application Priority Data

Aug. 28, 2001 (JP) .......................................... 2001-257531

(51) Int. Cl.[7] .............................................. F16D 3/205
(52) U.S. Cl. ........................................ 464/111; 464/905
(58) Field of Search ................................ 464/111, 167, 464/905; 384/49, 51

(56) References Cited

U.S. PATENT DOCUMENTS

| | | | | |
|---|---|---|---|---|
| 2,812,222 A | * | 11/1957 | Gussack | ........................ 384/49 |
| 5,549,391 A | * | 8/1996 | Engbersen et al. | ........... 384/51 |
| 5,553,946 A | * | 9/1996 | Agari | ........................ 384/49 |
| 5,628,687 A | | 5/1997 | Genestre et al. | |
| 6,435,972 B1 | * | 8/2002 | Kita et al. | .................. 464/111 |
| 2002/0118898 A1 | * | 8/2002 | Blaurock et al. | ......... 384/51 X |
| 2003/0083133 A1 | * | 5/2003 | Sugiyama et al. | .......... 464/111 |

FOREIGN PATENT DOCUMENTS

| | | | | |
|---|---|---|---|---|
| DE | 29 11 614 A1 | * | 10/1979 | ................. 384/51 |
| JP | 2002-235769 | | 8/2002 | |
| WO | 92/15797 | | 9/1992 | |

* cited by examiner

*Primary Examiner*—Greg Binda
(74) *Attorney, Agent, or Firm*—Wenderoth, Lind, Ponack & L.L.P.

(57) ABSTRACT

A tripod type constant-velocity joint includes raceway grooves formed in side faces of each track groove formed in an inner periphery of an outer ring, and in side faces of each guide block supported by each of three trunnions of a tripod member. A plurality of rolling elements mounted between the raceway grooves are retained by retainers. The retainers have a structure such that a plurality of pockets are formed in plate members, and a plurality of claws extending in opposite directions are provided on a periphery of each pocket, so that the retainers can be formed by performing pressing operations.

12 Claims, 4 Drawing Sheets

TRIPOD TYPE CONSTANT-VELOCITY JOINT

BACKGROUND OF THE INVENTION

This invention relates to a tripod type constant-velocity joint in which torque is transmitted between an outer ring, formed with three track grooves in its inner periphery, and a tripod member mounted in the outer ring.

Tripod type constant-velocity joints are known in which three axially extending track grooves are formed in an inner periphery of an outer ring, roller guide surfaces formed in respect track grooves so as to oppose one another in a circumferential direction are cylindrically shaped, a tripod member mounted in the outer ring has trunnions at positions corresponding to respective track grooves, and spherical, rollers pivotably supported by the trunnions are arranged in the track grooves so as to transmit torque between the outer ring and the tripod member at portions where the spherical rollers engage roller guide surfaces of the track grooves.

With such a tripod type constant-velocity joint, when torque is transmitted with the outer ring and the tripod member taking a working angle, centers of rotation of the spherical rollers are inclined relative to length directions of the track grooves. Due to this inclination, the spherical rollers will not make a pure rolling motion, and relative slip occurs between the spherical rollers and the roller guide surfaces on the track grooves.

Therefore, frictional resistance increases at contact portions between the spherical rollers and the roller guide surfaces, so that slide resistance is large when the outer ring and the tripod member relatively move in an axial direction. Thus, pivoting and noise are produced and NVH (noise, vibration and harshness) properties lower.

In order to improve the NVH properties, in a tripod type constant-velocity joint described in JP patent publication 64-5164, raceway grooves extending in an axial direction are formed in side faces of track grooves formed in an outer ring, raceway grooves are formed on both sides of guide blocks supported by trunnions of a tripod member so as to be pivotable in a moving direction of the tripod member relative to the trunnions, and a plurality of balls are mounted between the guide blocks and the outer ring so as to transmit torque between the outer ring and the tripod member through the balls.

In this tripod type constant-velocity joint, even when the outer ring and the tripod member take a working angle, the guide blocks are maintained at a constant position by the balls mounted between the raceway grooves on the guide blocks and the raceway grooves on the outer ring. Thus, this tripod type constant-velocity joint is characterized in that when the outer ring and the tripod member relatively move in the axial direction, the balls move while rolling, so that vibration and noise are less likely to be produced and the tripod type constant-velocity joint exhibits good NVH properties.

In the tripod type constant-velocity shown in this publication, it is necessary to provide a ball dropout preventive portion for preventing the balls from dropping out at both ends of the raceway grooves on the guide blocks. Thus, when a working angle between the outer ring and the tripod member increases, the balls will contact the dropout preventive portion, so that they cannot smoothly roll, thus producing slip. This worsens the NVH properties in a slip region.

In order to solve such a problem, as shown in FIG. 6, a tripod type constant-velocity joint is proposed in which a plurality of balls 35 are mounted between raceway grooves 31 formed on both sides of each track groove 30 and raceway grooves 34 on both sides of a guide block 33 pivotably supported by each trunnion 33 of a tripod member to maintain a position of the guide block 33. The balls 35 are retained by a retainer 36, and a moving distance of the retainer 36 is restricted to half of a moving distance of the guide block 33 by virtue of a moving distance restricting device to cause the balls 35 to always make a rolling motion.

In the tripod type constant-velocity joint shown in FIG. 6, when an outer ring and tripod member transmit torque while taking a maximum working angle, the balls 35 located at both ends of the retainer 36 can come off the raceway grooves 34 of each guide block 33. Thus, the retainer 36 has to be of such a structure as to prevent the balls 35 from dropping out of the raceway grooves.

Thus, with the retainer 36 in the tripod type constant-velocity joint shown in FIG. 6, the balls 35 are held by two pressed plate members 36a, 36b having a plurality of semispherical pockets 37, and the plate members 36a and 36b are coupled together by caulking a plurality of rivets 38.

In the tripod type constant-velocity joint shown in FIG. 6, since the balls 35 can always roll normally, NVH properties are superior. But, the retainer 36 is of such a structure that a number of parts is large because the two pressed plate members 36a, 36b are coupled together by caulking a plurality of rivets 38. Further, it is necessary to join the plate members 36a and 36b together so that the pockets 37 formed in the plate members 36a and 36b align with one another. Thus, it is extremely troublesome to assemble the retainer 36 and its cost is high. Thus, improvement is desired in achieving reduced cost and a lighter weight for a tripod type constant-velocity joint.

An object of this invention is to provide an improved tripod type constant-velocity joint which is superior with regard to NVH properties, low in cost and light in weight.

SUMMARY OF THE INVENTION

According to this invention, there is provided a tripod type constant-velocity joint comprising an outer ring, and a tripod member mounted in the outer ring. The outer ring is formed with three axially extending track grooves in an inner periphery thereof, and straight raceway grooves are formed in respective side faces of each track groove so as to extend in an axial direction of the outer ring and circumferentially oppose each other. The tripod member has three trunnions at positions corresponding to the track grooves, and guide blocks are supported by respective trunnions in the track grooves so as to be pivotable relative to the trunnions in a moving direction of the tripod member. The guide blocks each have raceway grooves on respective sides thereof so as to oppose the raceway grooves formed in a corresponding track groove. A plurality of rolling elements are mounted between the opposed raceway grooves, and retainers retain the rolling elements. A moving distance restricting unit restricts a moving distance of the retainers relative to half of a moving distance of the guide blocks. This tripod type constant-velocity joint is characterized in that the retainers comprise plate members each made of metal and having a plurality of pockets to receive the rolling elements, and a plurality of claws are provided on a periphery of each pocket and project in opposite directions, whereby the rolling elements are mounted in the pockets while elastically deforming the claws.

Since the retainers have a structure such that a plurality of pockets for receiving the rolling elements are formed in plate members, and a plurality of jaws are provided on a periphery of each pocket so as to extend in opposite directions, easy-to-manufacture, light-weight retainers are provided, so that it is possible to achieve reduced cost and lessened weight.

Since the rolling elements are mounted in the pockets while elastically deforming the claws, the rolling elements are prevented by the claws from coming out of the pockets, so that it is possible to reliably retain the rolling elements in the pockets. By providing two claws on a periphery of each pocket at opposed positions so as to extend in opposite directions, it is possible to prevent the rolling elements from coming out of the pockets.

Further, by providing four claws on a periphery of each pocket at 90° intervals so that a first set of two claws and a second set of two claws extend in opposite directions, it is possible to reliably prevent rolling elements from coming out of the pockets.

In the tripod type constant-velocity joint according to this invention, by forming the retainers by performing a pressing operation, it is possible to achieve further reduction in terms of cost of the constant-velocity joint.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
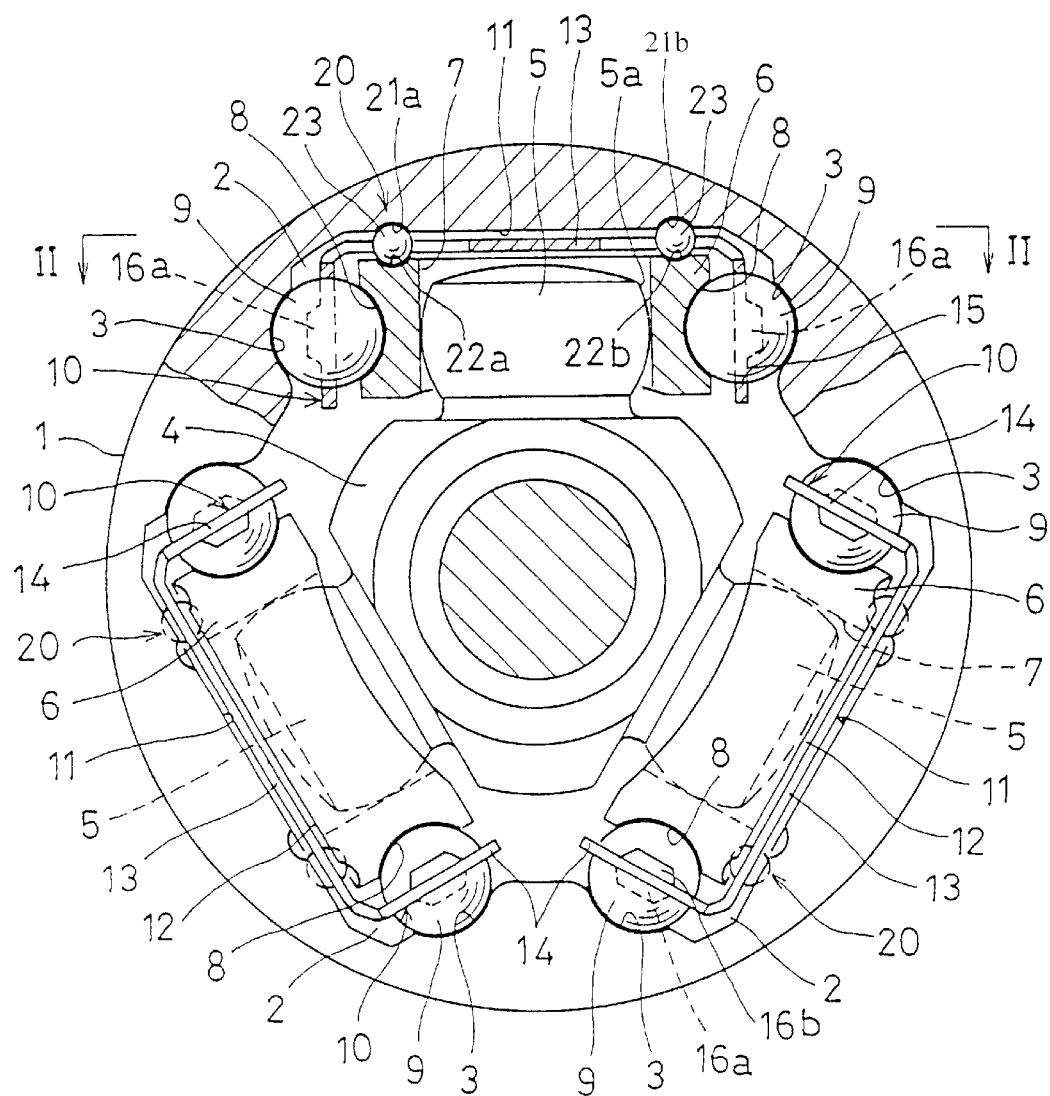
FIG. 1 is a partially cut-away front view showing an embodiment of a tripod type constant-velocity joint according to this invention.
Figure 2:
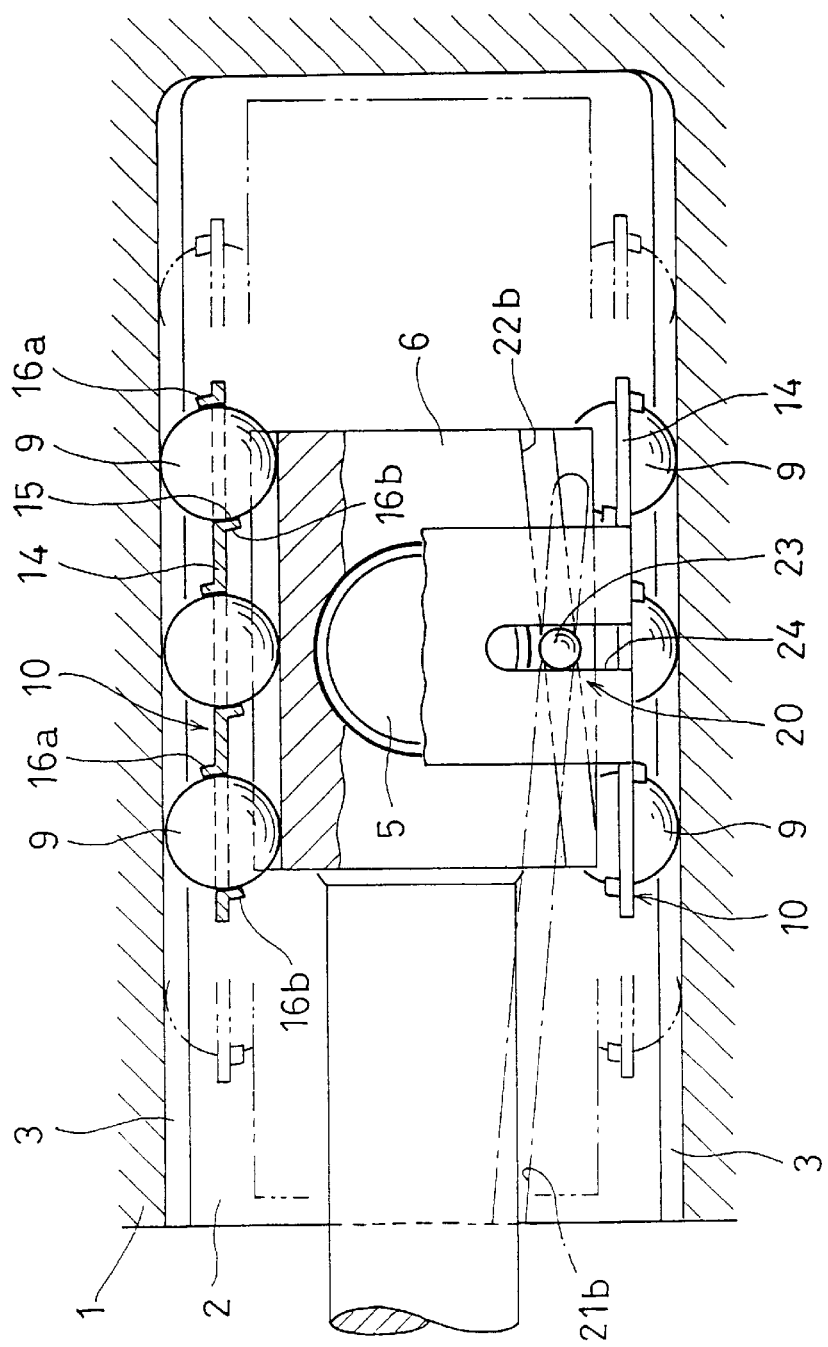
FIG. 2 is a sectional view along line II—II of FIG. 1.

Embodiments of this invention will be described with reference to the drawings. As shown in FIGS. 1 and 2, three axially extending track grooves 2 are formed in an inner periphery of an outer ring 1 at intervals of 120°. In side faces of each track groove 2 opposing one another in a circumferential direction are axially extending raceway grooves 3. 201 A tripod member 4 mounted in the outer ring 1 is provided with three trunnions 5 at positions corresponding to the track grooves 2. A guide block 6 is supported by each trunnion 5. In order to support the guide blocks 6, a spherical surface 5a is formed on each trunnion 5, and the trunnions are inserted into cylindrical holes 7 formed in respective guide blocks 6 so that the trunnions 5 and the guide blocks 6 will be pivotable in any direction relative to each other.

A raceway groove 8 is formed on each side of each of the guide blocks 6 so as to oppose respective raceway grooves 3 formed on respective sides of each of the track grooves 2.

On both sides of the guide blocks 6, a plurality of rolling elements 9 is arranged in an axial direction of the outer ring 1 and retained by retainers 10. A pair of retainers 10 on both sides of each guide block 6 is coupled by a coupling plate 13 (FIG. 3) mounted between an inner surface 11 of each track groove 2 and an outer surface 12 of each guide block 6.

Figure 3:
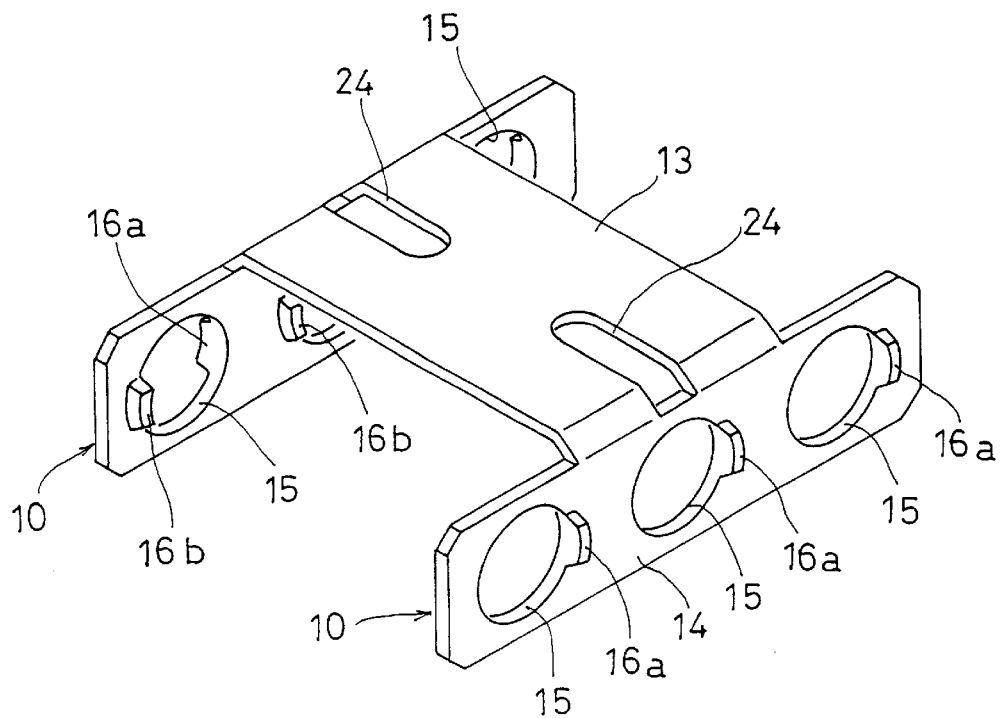
FIG. 3 is a perspective view showing retainers of the tripod type constant-velocity joint.

As shown in FIGS. 2 and 3, each retainer 10 comprises a plate member 14 having a plurality of pockets 15 for receiving the rolling elements 9. At opposite positions of a periphery of each pocket 15, claws 16a, 16b are formed. One of the claws 16a projects from an outer side of the plate member 14, while the other claw 16b projects from an inner side thereof so as to face away from each other.

Each rolling element 9 is mounted in a corresponding pocket 15 while elastically deforming one of the claws 16a, 16b. In this state, the rolling elements 9 are prevented from coming out of the pockets 15 by the claws 16a, 16b.

The retainers 10 having such a structure are formed by pressing a metallic plate. In a pressing step for forming the plate members 14, a plurality of pockets each formed with a pair of claws are simultaneously punched, and the claws of each pocket are bent in opposite directions by a bending punch inserted into the pocket from one side of the plate member 14 and another bending punch inserted from the other side of the plate member.

As shown in FIG. 3, if retainers 10 are integrally formed at both ends of the coupling plate 13, a blank is punched so that the plate members 14 are integrally formed at both ends of the coupling plate 13, and a plurality of pockets each formed with the pair of claws at opposed positions are simultaneously punched in each plate member 14. The claws of each pocket project in opposite directions and the plate members 14 are bent in the same direction relative to the coupling plate 13.

By mounting a plurality of rolling elements 9 between the raceway grooves 3 formed on both sides of each track groove 2 and the raceway grooves 8 formed on both sides of each guide block 6, it is possible to maintain a position of the guide blocks constant. When the outer ring 1 and the tripod member 4 take a working angle, slip occurs at contact portions between the spherical outer surfaces 5a of the trunnions 5 and the cylindrical inner surfaces of the guide blocks 6, so that the trunnions 5 will incline or pivot relative to axes of cylindrical holes 7 of the guide blocks 6.

Thus, when torque is transmitted while the outer ring 1 and the tripod member 4 take a working angle, the guide blocks 6 move along the track grooves 2 in the axial direction of the outer ring 1 with their positions maintained constant.

During movement of the guide blocks 6, the rolling elements 9 will move while rolling due to contact with the raceway grooves 3 and 8, so that a moving resistance of the guide blocks 6 is extremely small. Thus, the guide blocks 6 can slide smoothly without producing vibration while sliding.

A moving distance of the rolling elements 9 during sliding of the guide blocks 6 is about half of a moving distance of the guide blocks 6 if slipping at contact portions on the raceway grooves 3 and 8 is ignored. If a difference in a moving distance is produced between the rolling elements 9 and the retainers 10, the rolling elements 9 will slip, thus producing vibration.

Also, if the retainers 10, which retain the rolling elements 9, are simply mounted between sides of the track grooves 2 and sides of the guide blocks 6, the rolling elements 9 can slip at contact portions between the rolling elements 9 and the raceway grooves 3 and 8, or the retainers 10 can displace in an axial direction and come out of position due to vibration of a vehicle on which is mounted the constant-velocity joint.

In order to cause the rolling elements 9 to make a pure rolling movement and prevent them from dropping out of the raceway grooves 3 and 8, the moving distance of the retainers 10 is restricted to half of the moving distance of the guide blocks 6 by virtue of a moving distance restricting mechanism 20.

As shown in FIGS. 1 and 2, the moving distance restricting mechanism 20 has a pair of inclined grooves 21a, 21b elongated in the axial direction of the outer ring 1 and inclined in opposite directions. The inclined grooves 21a, 21b are formed in an inner surface 11 of each outer ring track groove 2. On the axially outer surface of each guide block 6 at positions opposing the inclined grooves 21a, 21b, a pair of inclined grooves 22a, 22b, which are inclined in opposite directions relative to the inclined grooves 21a, 21b, is formed.

A ball 23 is received in each intersecting portion of the inclined grooves 21a, 21b on the outer ring 1 and the inclined grooves 22a, 22b on the guide blocks 6. The balls 23 are supported in respective guide grooves 24 (FIG. 3) formed on both sides of the coupling plate 13. The guide grooves 24 are elongated in a direction perpendicular to a moving direction of the retainers 10. The balls 23 are movable along the guide grooves 24.

As described above, by forming oppositely inclined grooves 21a, 21b, 22a and 22b in the inner surface 11 of each track groove 2 and an axially outer surface 12 of each guide block 6, respectively, and supporting the balls 23 received in the intersecting portions of the inclined grooves 21a, 21b, 22a and 22b in the guide grooves 24 formed in each coupling plate 13 so as to be movable in a direction perpendicular to the moving direction of the retainers 10, the balls 23 will move by half of the moving distance of the guide blocks 6 due to contact with the inclined grooves 21a, 21b, 22a and 22b as the guide blocks 6 move along the track grooves 2. Thus, the retainers 10 also move by half of the moving distance of the guide blocks 6, so that the retainers will move by the same amount as the moving distance of the rolling elements 9, which move while rolling due to contact with the raceway grooves 3 and 8.

Thus, the rolling elements 9, which are subjected to loads, are always in a rolling state, so that it is possible to achieve good NVH (noise, vibration and harshness) properties over an entire sliding region.

Also, between the inner surface 11 of each track groove 2 and the axially outer surface 12 of each guide block 6, a space has only to be provided to receive the balls 23 and the coupling plate 13 for coupling each pair of retainers 10. Thus, it is possible to avoid an increase in size of the outer ring 1. This makes it possible to provide a compact constant-velocity joint.

The moving distance restricting mechanism 20 for restricting the moving distance of the retainers 10 to half of the moving distance of the guide blocks 6 is not limited to the embodiment shown.

As shown in FIGS. 1 and 3, the retainers 10 for supporting a plurality of rolling elements 9 have such a structure that a plurality of pockets 15 are formed in the plate members 14, and a pair of claws 16a, 16b, which extend in opposite directions, are provided at opposed positions of a periphery of each pocket 15. Compared with a conventional retainer in which two pressed metallic plates are joined together by caulking rivets, a retainer is provided which is small in its number of parts, easy to manufacture, low in cost, and light-weight.

Thus, it is possible to achieve reduced cost and lighter weight for a tripod type constant-velocity joint.

Also, by mounting each rolling element 9 in a corresponding pocket 15 while elastically deforming one of the pair of claws 16a and 16b, it is possible to stably hold the rolling elements 9 and prevent them from coming out of the pockets.

Figure 4:
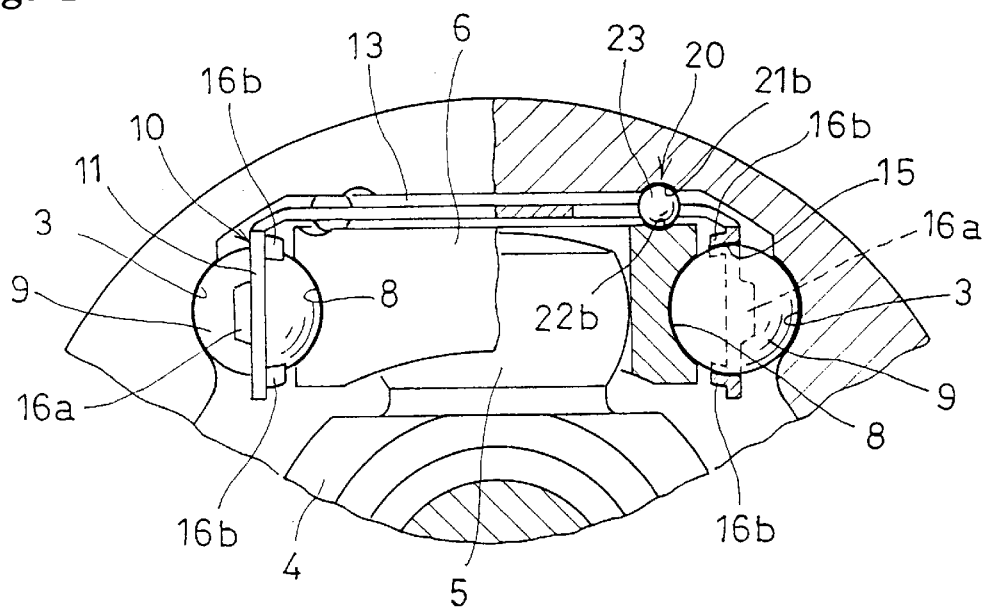
FIG. 4 is a partially cut-away front view of another embodiment of the tripod type constant-velocity joint according to this invention.
Figure 5:
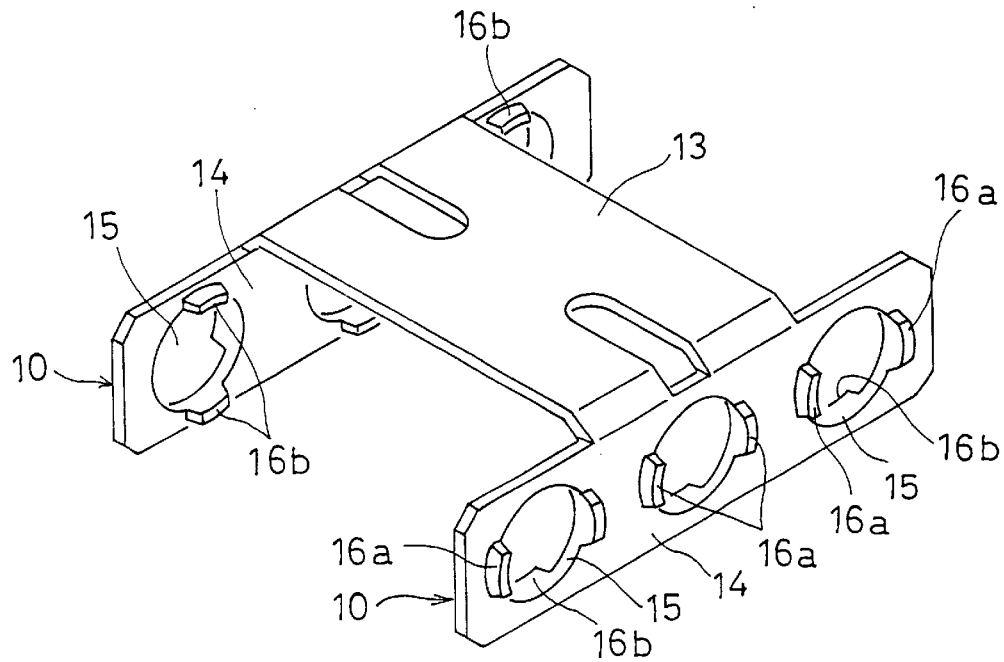
FIG. 5 is a perspective view showing retainers of the tripod type of constant-velocity joint of FIG. 4.
Figure 6:
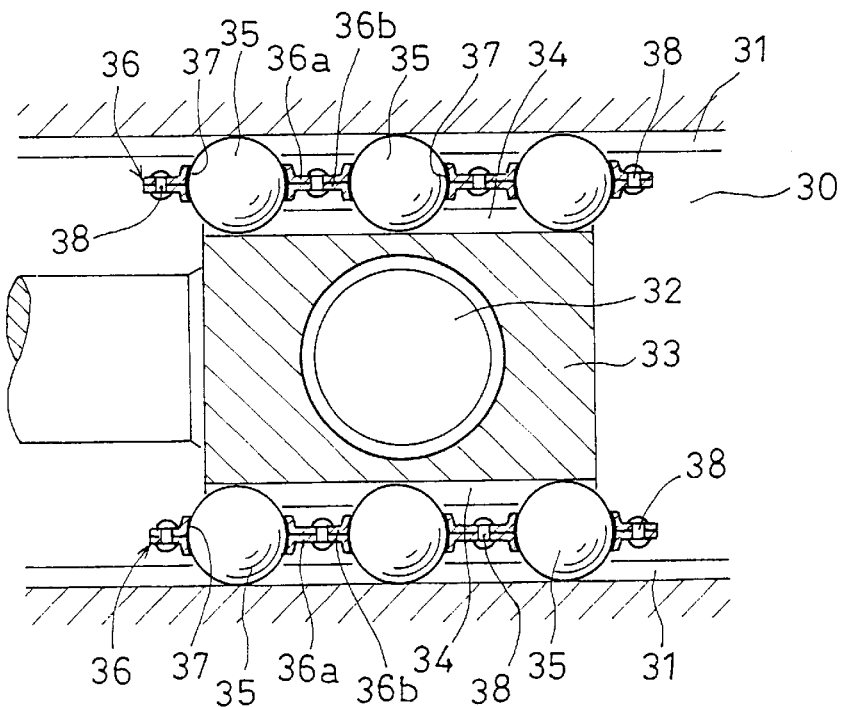
FIG. 6 is a transverse sectional plan view showing a conventional tripod type constant-velocity joint.

FIGS. 4 and 5 show another embodiment of retainers 10 for retaining a plurality of rolling elements 9. In this embodiment, four claws 16a, 16b are formed on a periphery of each of pockets 15, formed in plate member 14, at intervals of 90°. Two claws 16a arranged at opposed positions project from one side of the plate member 14 and the remaining two claws 16b project from another side of the plate member to prevent the rolling elements 9 mounted in the pockets 15 from coming out of the pockets.

By providing four claws 16a and 16b on the periphery of each pocket 15, it is possible to stably retain the rolling elements 9 and more reliably prevent them from coming out of the pockets.

As described above, according to this invention, because retainers for retaining a plurality of rolling elements are of such a structure that a plurality of pockets are formed in a single metallic plate member, and a plurality of claws extending in opposite directions are formed on an inner periphery of each pocket, it is possible to provide retainers that are low in cost and light-weight. Thus, it is possible to achieve reduced cost and lessened weight for a tripod type constant-velocity joint.

What is claimed is:

1. A tripod type constant-velocity joint comprising:

an outer ring, said outer ring defining three axially extending track grooves along an inner periphery of said outer ring, said three axially extending track grooves each having first and second side faces with axially extending raceway grooves therein, respectively, such that said axially extending raceway groove in said first side face circumferentially opposes said axially extending raceway groove in said second side face;

a tripod member mounted within said outer ring, said tripod member having three trunnions at positions that correspond to said three axially extending track grooves, respectively;

three guide blocks supported by said three trunnions within said three axially extending track grooves, respectively, so as to be pivotable relative to said three trunnions, respectively, in a moving direction of said tripod member, said three guide blocks each having first and second side faces with a raceway groove therein such that said raceway groove in said first side face of a corresponding one of said three guide blocks opposes said axially extending raceway groove in said first side face of a corresponding one of said three axially extending track grooves and said raceway groove in said second side face of said corresponding one of said three guide blocks opposes said axially extending raceway groove in said second side face of said corresponding one of said three axially extending track grooves;

rolling elements mounted between said raceway grooves of said three guide blocks and said axially extending raceway grooves of said three axially extending track grooves that oppose one another;

retainers for retaining said-rolling elements between said raceway grooves of said three guide blocks and said axially extending raceway grooves of said three axially extending track grooves that oppose one another, said retainers each including (i) a plate member having first and second oppositely facing sides and pockets for receiving said rolling elements, respectively, and (ii) claws along a periphery of each of said pockets and projecting from said first side of said plate member and said second side of said plate member such that said claws that project from said first side of said plate member extend in a direction opposite to that in which said claws that project from said second side of said plate member extend, wherein none of said claws along said periphery of a respective said each of said pockets overlaps with any other of said claws along said periphery of said respective said each of said pockets in a peripheral direction of said respective said each of said pockets; and moving distance restricting units for restricting a moving distance of said retainers, respectively, to half of a moving distance of said three guide blocks, wherein said retainers are for retaining said rolling elements in said pockets, respectively, by deforming said claws.

2. The tripod type constant-velocity joint according to claim 1, wherein said plate member comprises a metal plate member.

3. The tripod type constant-velocity joint according to claim 2, wherein said claws comprise two claws projecting from said first side of said metal plate member and two claws projecting from said second side of said metal plate member.

4. The tripod type constant-velocity joint according to claim 3, wherein said retainers are each made by performing a pressing operation.

5. The tripod type constant-velocity joint according to claim 3, wherein said two claws projecting from said first side of said metal plate member and said two claws projecting from said second side of said plate member are spaced from one another by 90° intervals.

6. The tripod type constant-velocity joint according to claim 5, wherein said retainers are each made by performing a pressing operation.

7. The tripod type constant-velocity joint according to claim 2, wherein said retainers are each made by performing a pressing operation.

8. The tripod type constant-velocity joint according to claim 1, wherein said claws comprise two claws projecting from said first side of said plate member and two claws projecting from said second side of said plate member.

9. The tripod type constant-velocity joint according to claim 8, wherein said two claws projecting from said first side of said metal plate member and said two claws projecting from said second side of said plate member are spaced from one another by 90° intervals.

10. The tripod type constant-velocity joint according to claim 9, wherein said retainers are each made by performing a pressing operation.

11. The tripod type constant-velocity joint according to claim 8, wherein said retainers are each made by performing a pressing operation.

12. The tripod type constant-velocity joint according to claim 1, wherein said retainers are each made by performing a pressing operation.

* * * * *